US008205238B2

(12) United States Patent
Blumenthal et al.

(10) Patent No.: US 8,205,238 B2
(45) Date of Patent: Jun. 19, 2012

(54) PLATFORM POSTURE AND POLICY INFORMATION EXCHANGE METHOD AND APPARATUS

(75) Inventors: Uri Blumenthal, Fair Lawn, NJ (US);
Hormuzd Khosravi, Portland, OR (US);
Karanvir Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1574 days.

(21) Appl. No.: 11/393,486

(22) Filed: Mar. 30, 2006

(65) Prior Publication Data
US 2007/0240197 A1   Oct. 11, 2007

(51) Int. Cl.
*H04L 29/06* (2006.01)
(52) U.S. Cl. ........................................ 726/1; 713/164
(58) Field of Classification Search ....... 726/1; 713/164
See application file for complete search history.

(56) References Cited

U.S. PATENT DOCUMENTS

| | | | |
|---|---|---|---|
| 5,590,285 A | 12/1996 | Krause et al. | |
| 6,920,558 B2 * | 7/2005 | Sames et al. | 713/166 |
| 7,457,951 B1 * | 11/2008 | Proudler et al. | 713/164 |
| 7,512,970 B2 * | 3/2009 | Naftali et al. | 726/4 |
| 7,526,785 B1 * | 4/2009 | Pearson et al. | 725/31 |
| 7,536,464 B1 | 5/2009 | Dommety et al. | |
| 7,587,751 B2 * | 9/2009 | Potter et al. | 726/2 |
| 7,716,720 B1 * | 5/2010 | Marek et al. | 726/2 |
| 7,734,933 B1 * | 6/2010 | Marek et al. | 713/193 |
| 7,739,724 B2 * | 6/2010 | Durham et al. | 726/3 |
| 2002/0095514 A1 | 7/2002 | Cromer et al. | |
| 2002/0129264 A1 | 9/2002 | Rowland et al. | |
| 2002/0129274 A1 | 9/2002 | Baskey et al. | |
| 2002/0138726 A1 * | 9/2002 | Sames et al. | 713/166 |
| 2002/0146980 A1 | 10/2002 | Solondz et al. | |
| 2004/0088369 A1 | 5/2004 | Yeager et al. | |
| 2004/0107360 A1 | 6/2004 | Herrmann et al. | |
| 2004/0177248 A1 | 9/2004 | Yoshida | |
| 2004/0179540 A1 | 9/2004 | Lee et al. | |
| 2004/0179684 A1 | 9/2004 | Appenzeller et al. | |
| 2004/0268140 A1 | 12/2004 | Zimmer et al. | |
| 2005/0050363 A1 | 3/2005 | Naka et al. | |
| 2005/0228874 A1 | 10/2005 | Edgett et al. | |
| 2006/0015724 A1 * | 1/2006 | Naftali et al. | 713/168 |
| 2006/0026670 A1 * | 2/2006 | Potter et al. | 726/7 |
| 2006/0026671 A1 * | 2/2006 | Potter et al. | 726/7 |
| 2006/0031790 A1 * | 2/2006 | Proudler et al. | 716/1 |
| 2006/0136717 A1 | 6/2006 | Buer et al. | |
| 2006/0143292 A1 | 6/2006 | Taubenheim et al. | |
| 2006/0150250 A1 | 7/2006 | Lee et al. | |
| 2006/0156391 A1 * | 7/2006 | Salowey | 726/5 |
| 2006/0236127 A1 | 10/2006 | Kurien et al. | |
| 2007/0016801 A1 | 1/2007 | Bade et al. | |

(Continued)

OTHER PUBLICATIONS

Ken Grewal, 802.1 AE/AF Platform Considerations, Nov. 2004, IEEE 802.1 Plenary.*

(Continued)

*Primary Examiner* — David Garcia Cervetti
(74) *Attorney, Agent, or Firm* — Schwabe, Williamson & Wyatt, P.C.

(57) ABSTRACT

Transport agnostic, secure communication protocol for transmitting host platform posture information to the Network Access Control Server or PDP (Policy Decision Point) and for receiving policy information to be enforced on the trusted host platform and respective applications for data processing and communication are described herein.

24 Claims, 6 Drawing Sheets

U.S. PATENT DOCUMENTS

| | | | |
|---|---|---|---|
| 2007/0150559 A1* | 6/2007 | Smith | 709/220 |
| 2007/0156858 A1* | 7/2007 | Sood et al. | 709/220 |
| 2007/0208937 A1* | 9/2007 | Cam-Winget et al. | 713/168 |
| 2007/0234402 A1* | 10/2007 | Khosravi et al. | 726/2 |
| 2007/0234412 A1* | 10/2007 | Smith et al. | 726/11 |
| 2007/0239748 A1* | 10/2007 | Smith | 707/101 |
| 2008/0005359 A1* | 1/2008 | Khosravi et al. | 709/250 |
| 2008/0022355 A1* | 1/2008 | Khosravi et al. | 726/1 |
| 2008/0141024 A1* | 6/2008 | Ranganathan | 713/155 |
| 2010/0005531 A1* | 1/2010 | Largman et al. | 726/24 |

OTHER PUBLICATIONS

U.S. Appl. No. 11/480,629, filed Jun. 30, 2006, Khosravi et al.

Office Action, issued in U.S. Appl. No. 11/323,333, mailed Nov. 12, 2010, 21 pages.

Office Action for U.S. Appl. No. 11/323,333 mailed Nov. 12, 2010, 22 pages.

Office Action for U.S. Appl. No. 11/323,333 mailed Mar. 23, 2011, 26 pages.

Notice of Allowance, issued in U.S. Appl. No. 11/323,333, mailed Sep. 16, 2011, 18 pages.

Office Action for U.S. Appl. No. 11/323,333, mailed Dec. 22, 2008, 33 pages.

Supplemental Office Action for U.S. Appl. No. 11/323,333, mailed Jan. 16, 2009, 33 pages.

Final Office Action for U.S. Appl. No. 11/323,333, mailed Jul. 9, 2009, 36 pages.

Office Action for U.S. Appl. No. 11/323,333, mailed Jan. 14, 2010, 46 pages.

Final Office Action for U.S. Appl. No. 11/323,333, mailed Jun. 29, 2010, 40 pages.

DeLiberato, Daniel, et al., "Intel and Cisco Collaborate to Improve Enterprise Security," Technology@Intel Magazine, Sep. 2005, pp. 1-8.

* cited by examiner

PLATFORM POSTURE AND POLICY INFORMATION EXCHANGE METHOD AND APPARATUS

TECHNICAL FIELD

Presented embodiments relate to the fields of data processing and data communication. More particularly, various embodiments relate to techniques for exchanging platform posture and policy information to control network access.

BACKGROUND

The proliferation of computer viruses and/or worm attacks in combination with the tendency for many of these malware mechanisms (e.g., worms, viruses, Trojan horses, rootkits) to propagate into corporate networks reinforce the movement for industry-wide development of network security measures to ensure that unauthorized and incompliant devices are not allowed access to various network assets. One manifestation of these efforts can be seen in the various proprietary and/or standards-based solutions for operating systems to measure various pertinent attributes of a host device. In an endeavor to eliminate, isolate, and reduce the impact and/or effects of malware, these measured attributes of a host device are now often evaluated, with the assistance of operating systems, before allowing that host device to connect to a protected network. Unfortunately, sophisticated malware may even attempt to intercept and alter transmissions within the operating system of the host device in an attempt to cloak their presence from network detection. Other malware is designed to intercept and to alter network authentication/access requests so as to report uninfected results at least until the network connection is activated by the operating system of the host device.

BRIEF DESCRIPTION OF THE DRAWINGS

The various presented embodiments will be described by way of exemplary configurations, but not limitations, illustrated in the accompanying drawings in which like references denote similar elements, and in which.

DETAILED DESCRIPTION

Figure 1:
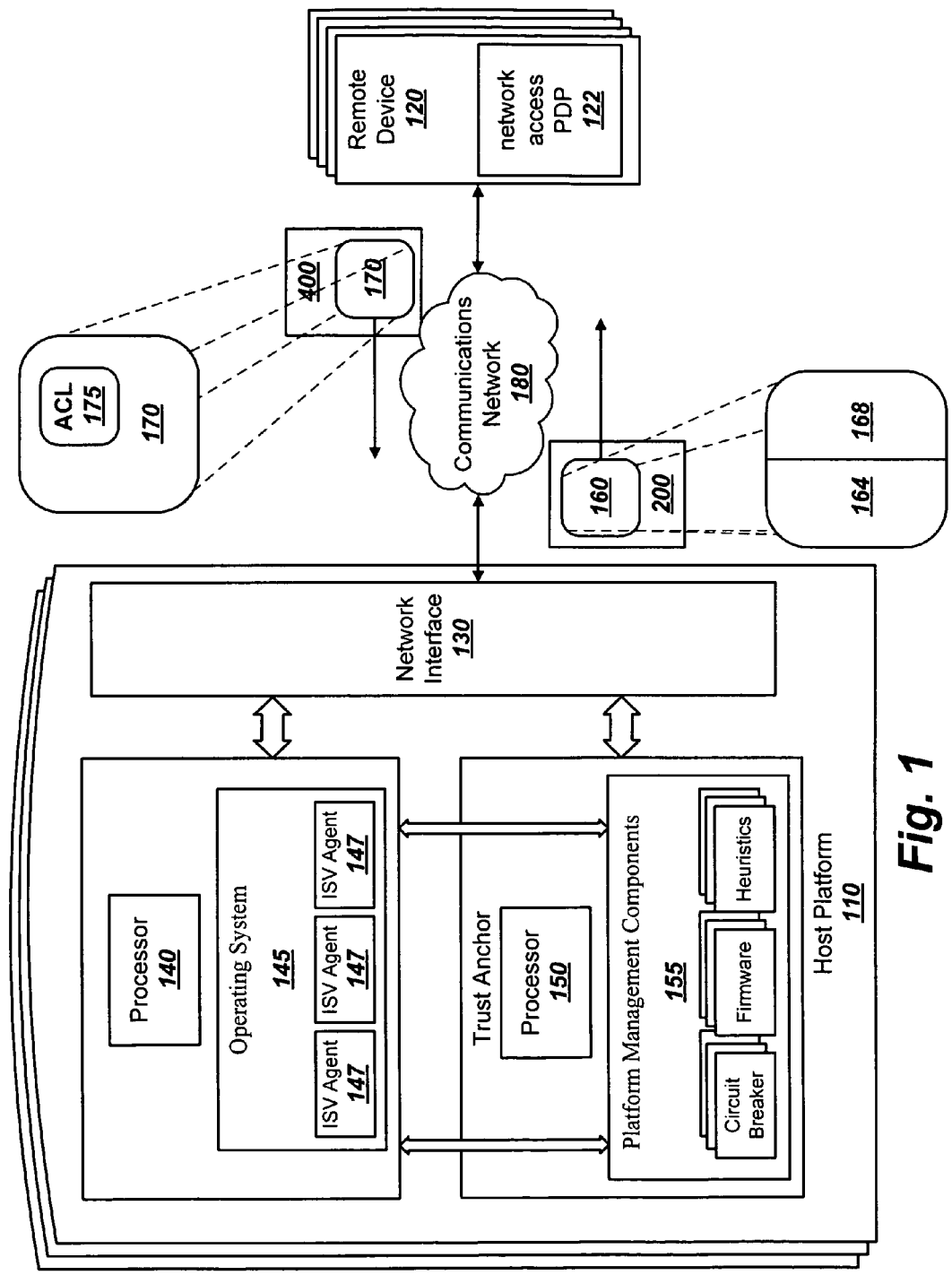
FIG. 1 illustrates a block diagram of a host platform coupled with various network components in accordance with various embodiments.

In the following detailed description, reference is made to the accompanying drawings which form a part hereof wherein like numerals designate like parts throughout, and in which are shown, by way of illustration, specific embodiments. It is to be understood that other embodiments may also be utilized and structural or logical changes may be made without departing from the scope. In other instances, well-known circuits, structures and techniques have not been shown in detail in order not to obscure the understanding of this description. Therefore, the following detailed description is not to be taken in a limiting sense, and the scope of the various embodiments is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but it may. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional.

Embodiments describe a protocol for conveying platform based posture information and receiving network access policy information, based in part on the platform posture information, which can be enforced on the platform where the protocol is secured and/or transport agnostic. Platform management components on a host platform provide a trust anchor for secure communication of reliable, independently attested attribute information to a remote device, such as a Policy Decision Point (PDP), within a given network domain.

Once these attributes of the host platform system are reported, in various embodiments, a Network Access Control (NAC) Server and/or PDP in the network may make a policy decision regarding whether to allow the requested connection. These policy decisions are returned to a trusted Policy Enforcement Point (PEP) in the form of policy information. In one embodiment, the PEP may include the processor and management components within the trust anchor on the host platform. In one embodiment, if an access request is to be granted, a token is provided in the policy information transmitted back to a connection point indicating whether the host device is allowed on the network and which network resources should be accessible to the host on that network.

Although various embodiments describe the different security properties of this information exchange, they may be used individually or in various combinations so that exchanged information cannot be modified by an intermediate entity as it is exchanged between the host platform and the PDP, or the likelihood of such information being modified is substantially reduced. Various embodiments also describe specific encapsulations of the posture and policy information, without restricting the usage of the information to alternative instantiations. Additional instantiations of the described embodiments may contain a larger or smaller set of the currently defined posture and/or policy information.

Referring to FIG. 1, a block diagram of a platform posture and policy information exchange between at least one host platform 110 and at least one remote device 120 in accordance with various embodiments is shown. The host platform 110 includes a network interface 130, a first processor 140, a second processor 150, an operating system 145, one or more software components 147, and one or more platform management components 155, operationally coupled to each other as shown. The network interface 130, coupled with the first and/or the second processor 150, is configured to communicate with the remote device 120. The software components 147, such as independent software vendor (ISV) agents, are adapted to be executed by the first processor 140 under the direction of the operating system 145. The platform management components 155 are adapted to be executed by the second processor 150 independent of the operating system 145.

In various embodiments, the platform management components 155 determine platform posture information 160 of the host 110. The platform posture information 160 is exchanged with a remote device 120 via the network interface 130. The platform posture information 160 includes host posture information 164 and/or firmware posture information 168.

In various embodiments, a secured data envelope 200 having multiple data fragments is used to transmit the platform posture information 160 to the remote device 120. Each data fragment includes posture information associated with a platform component of the host platform. The secured data envelope 200 contains information about the posture of various platform components, including, but not limited to, the management engine (ME), host Operating System (O/S), and software services, hardware components and any other entity deemed pertinent for evaluation based on administrative policy and capabilities available within a given platform architecture. One embodiment of the secured data envelope is described in more detail in FIG. 2 below.

In one embodiment the secured data envelope 200/400 provides all of the information in the posture/policy exchange wrapped in an XML (Extensible Markup Language)/SOAP (Simple Object Access Protocol) format. The additional signing of this secured data envelope is leveraged with one of the XML signature protocols to provide a widely available set of tools for encapsulating the posture and policy information in a secure manner. In various embodiments, multiple posture and policy data elements, such as SOAP/XML Header/Body constructs are also used to convey posture policy pertinent to different entities on the platform. In still other embodiments, the posture and policy information may be exchanged via other forms of secured messages.

After the platform posture information 160 is provided to the remote device 120 via the network interface 130, at least one embodiment receives policy information 170 from the remote device 120 in another secured data envelope 400. In various embodiments, the remote device 120 includes a network access policy decision point (PDP) 122. In one embodiment, the policy information 170 indicates a location of a remediation network. The received policy information 170 is generated, based at least in part, on the previously provided platform posture information 160.

In various embodiments, the policy information 170 may supply any number of filter configurations (e.g., L2 Extensible Authentication Protocol Over LAN (EAPOL), L# Virtual Private Network (VPN), L4 VPN, Transport Layer Security (TLS) web server, Remote Authentication Dial-In User Service (RADIUS) server, or Internet Service Provider (ISP) server) that may enable posture assessment via any number of networks. Default filters may be designated for expiration after a period of time and configured so that the filters may be refreshed by a PDP on subsequent network connection/access requests.

In one embodiment, a network cable or an omni-directional antenna is connected to the network interface 130 of the host platform 110 and is configured to form a communication channel via communications network 180 with at least one remote device 120. In this manner, the host platform 110 may use a wired and/or wireless connection to facilitate the exchange of platform posture information 160 and policy information 170 between the remote device 120 and the host platform 110. Moreover, the at least one remote device 120 may represent multiple devices, each device being selected from a variety of different devices or classes of devices typically found in a networking environment. Thus, at least one remote device may operate as a policy enforcement point, an access server, and/or a policy decision point. Similarly, the at least one host platform device 110, may also represent multiple devices, each initially functioning as a network access requestor until the posture and policy information is successfully exchanged.

In various embodiments, following the posture and policy information exchange, the platform management components 155 configure the host, at least in part, in accordance with the policy information 170 received from the remote device 120. In one embodiment, the platform management components 155 are adapted to configure the network interface 130 to facilitate controlled network access by the host platform 110 based at least in part on the received policy information 170.

The policy information 170 may also include one or more data elements to allow and/or to restrict one or more services from executing on the first processor 140. In one embodiment, the policy information 170 includes an access control list (ACL) 175. The ACL 175 includes one or more constraints related to time of access, network traffic filters, firmware version, and/or firmware operational status.

In various embodiments, the policy information 170 is transmitted and received in a secured manner. In one embodiment, the policy information 170 is transmitted and received in the same secured manner as the platform information 160 is transmitted and received, in particular, in the earlier described secure extensible marked up language format. In alternative embodiments, alternative encapsulation methods may be leveraged.

In various embodiments, the secure communications protocol for network access control could be standardized via industry forums such as the Internet Engineering Task Force (IETF) and Trusted Computing Group (TCG) that are working on other network access control related standard protocols. Other acceptable network access control related standard protocols include Extensible Authentication Protocol (EAP), EAP—Flexible Authentication via Secure Tunneling (FAST), EAP—Transport Layer Security (TLS), EAP—Tunneled TLS (TTLS), Protected EAP (PEAP), Light EAP (LEAP), EAP—Subscriber Identity Module (SIM), and other protocols that act as both a framework and transport for other underlying authentication protocols.

Figure 2:
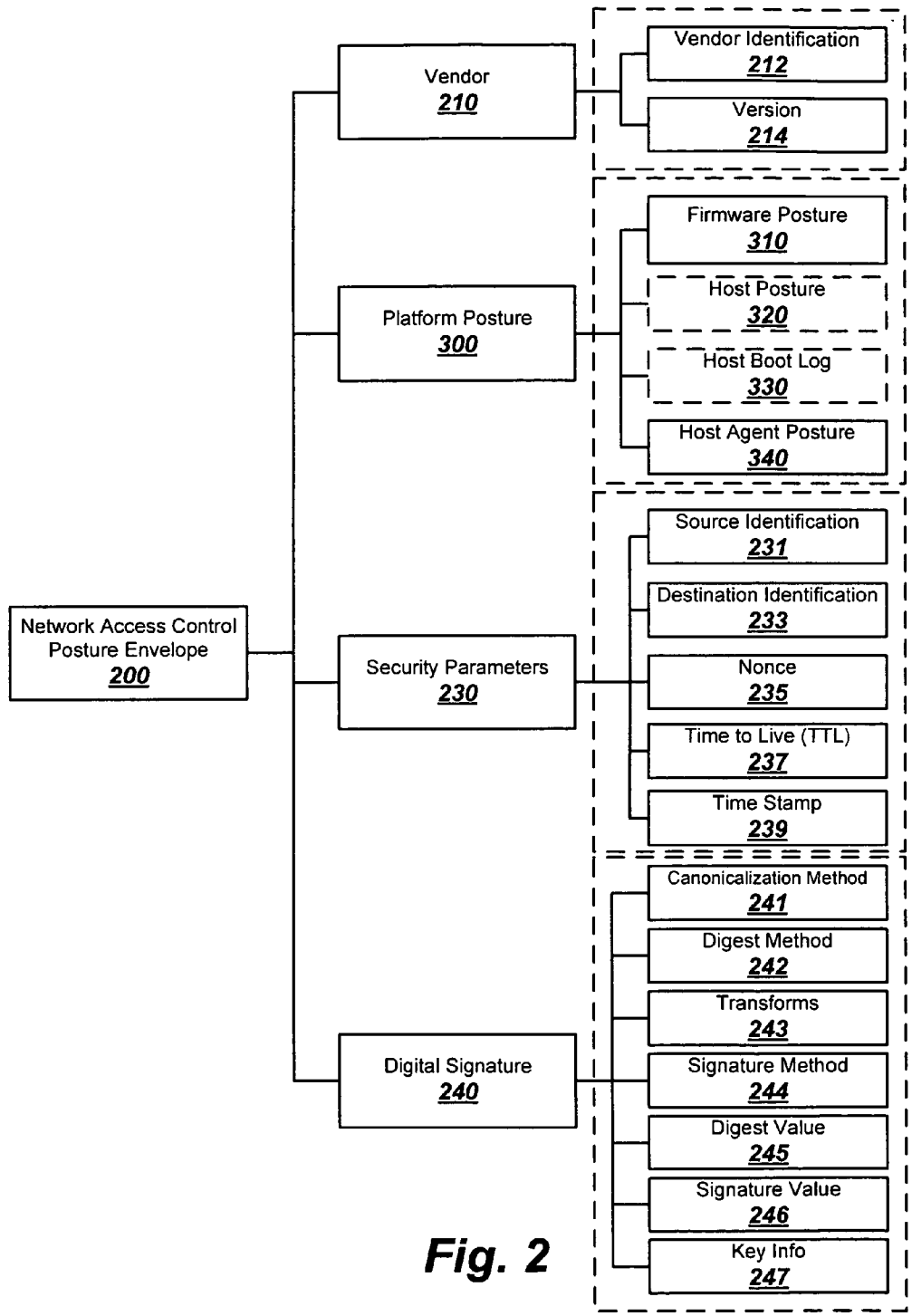
FIG. 2 illustrates a block diagram of a portion of a platform posture message in a secured data envelope as presented in FIG. 1 in further detail, in accordance with various embodiments.

Referring to FIG. 2, a block diagram of a portion of the platform posture content in a network access control secured data envelope 200 as presented in FIG. 1 is shown in further detail, in accordance with various embodiments. The secured data envelope 200 contains information about the posture of various platform components, including but not limited to, vendor information 210, platform posture information 300, security parameters 230, and/or digital signature information 240. In alternate embodiments, more ore less information may be included.

The vendor information 210 may include vendor identification 212 and version information 214. In one embodiment, the vendor identification 212 is likely a static identifier, but is provided in case multiple attestation agents are used. Indicating the version information 214 of the envelope provides for backward compatibility. The platform posture information 300 is shown and described in further detail in FIG. 3. In alternate embodiments, more ore less vendor information may be included.

Security parameters 230 may include portions of the secured data envelope to ensure that authorized devices may validate the enclosed data and that unauthorized and incompliant devices are denied access. The illustrated embodiment of the security parameters 230 include various fields for source identification 231, destination identification 233, a nonce 235, time to live (TTL) status identification 237, and/or time stamp information 239. In alternate embodiments, more ore less security parameters may be included.

In one embodiment, the source identification 231 provides a unique identification indicating the envelope generator, such as the ME on the host platform 110, and may be used to select data signing keys. The destination identification 233 provides a unique identification indicating the envelope consumer, such as the access server authority, and may be used to select data validation keys.

A nonce 235, time to live (TTL) status identification 237, and time stamp information 239 are all time sensitive parameters that help determine whether a security envelope has been tampered with. The nonce 235, or replay avoidance counter, should be provided to mitigate various liveliness security threats. More specifically, the nonce 235 varies with time and can be linked to the time stamp information 239, the TTL status identification 237, and/or to a special marker intended to limit or prevent the unauthorized replay or reproduction of a file, such as a visit counter on a Web page or remediation network. Because a nonce 235 changes with time, whether or not a legitimate request to replay or to reproduce a file has been made can determined, the current time can be compared with the nonce 235. In one embodiment, the nonce 235 is a monotonically increasing number or random value. If the time does not exceed the nonce or if no nonce 235 exists, then the attempt is considered authorized. Otherwise, the attempt is not authorized. In one embodiment, the nonce 235 is a session correlator for message exchange.

In one embodiment, the TTL status identification 237 specifies a time based value indicating the life of received filters. Moreover, the TTL status identification 237 could also be applicable to posture information indicating the life of received posture data. In another embodiment, the TTL status identification 237 may demonstrate how many more hops a packet or envelope can travel before being discarded or returned. In this manner, the ME and PDP can determine whether the envelope made extra stops or was delayed during transmission to or from the network access PDP. In one embodiment, the time stamp information 239 provides a value indicating when the signature was applied. Other security fields may also be used to secure the data in the security envelopes 200 and 400.

In the illustrated embodiment, the digital signature information 240 includes at least one of canonicalization method 241, digest method 242, transforms 243, signature method 244, digest value, 245, signature value 246 and key information 247. The applied digital signature will typically be a hash of the pertinent data, which is signed by an asymmetric key. The algorithms (and size) may be defined/changed in a latter envelope. Alternative signature parameters may be used to secure the data in the security envelopes 200 and 400.

The canonicalization method 241, in an embodiment using XML, refers to the algorithm that generates the canonical form of a given XML document or document subset. In one embodiment, canonicalization method 241 identifies the specific algorithm used to generate the canonical form of a document.

The digest method 242 identifies the algorithm that creates the message digest signed by the signature method 244. In one embodiment, the digest method 242 identifies algorithm applied to the data after transforms 243 are applied, if transforms 243 are specified, to yield the digest value 245. The signing of the digest value 245 binds resource content to the signer key so that the algorithm selected for the client response receiver configuration matches the algorithm selected in the server response sender configuration.

Figure 3:
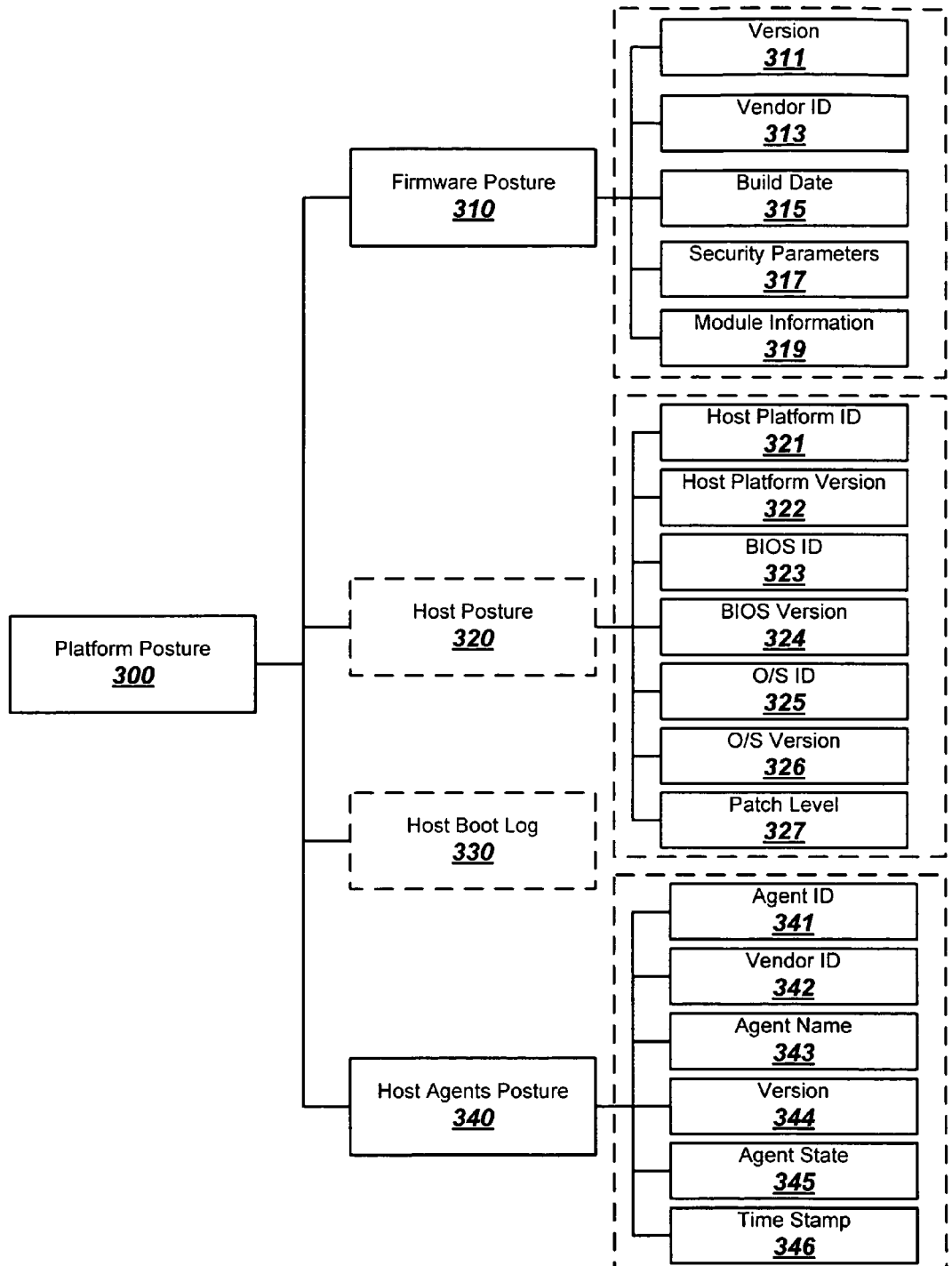
FIG. 3 illustrates a block diagram of a portion of a platform posture message in a secured data envelope including posture information as presented in FIG. 2 in further detail, in accordance with various embodiments.

Referring to FIG. 3, a block diagram of a portion of the posture information in the network access control secured data envelope 200 including platform posture information 300 as presented in FIG. 2 is shown in further detail, in accordance with various embodiments. For the embodiments, the platform posture information 300 includes firmware posture information 310, optionally Host Posture information 320, optionally a Host Boot Log 330, and/or Host Agent Posture information 340. In alternate embodiments, more ore less platform posture information may be included.

The firmware posture information 310 in various embodiments may include at least one of posture version identification 311, a vendor identifier 313, a build date identifier 315, a posture image size, security parameters 317, and module information 319. The module information 319 may include at least one of a number of modules, a module identifier, module version identification, a module size, and a module flag.

In various embodiments, the host posture information 320 may include at least one of platform identification 321, platform revision identification 322, Basic Input/Output System (BIOS) identification 323, BIOS revision identification 324, Extensible Firmware Interface (EFI) identification, EFI revision identification, host operating system identification 325, host operating system revision identification 326, patch level 327, and/or Trusted Platform Module capability identification.

Each ISV agent on the host platform may provide or generate a set of host agent posture information 340. The host agent posture information 340 may include data fields for Agent identification 341, Vendor identification 342, Agent name 343, agent version 344, agent operational state 345 (e.g., running, stopped, suspended), and/or time stamp 346.

Figure 4:
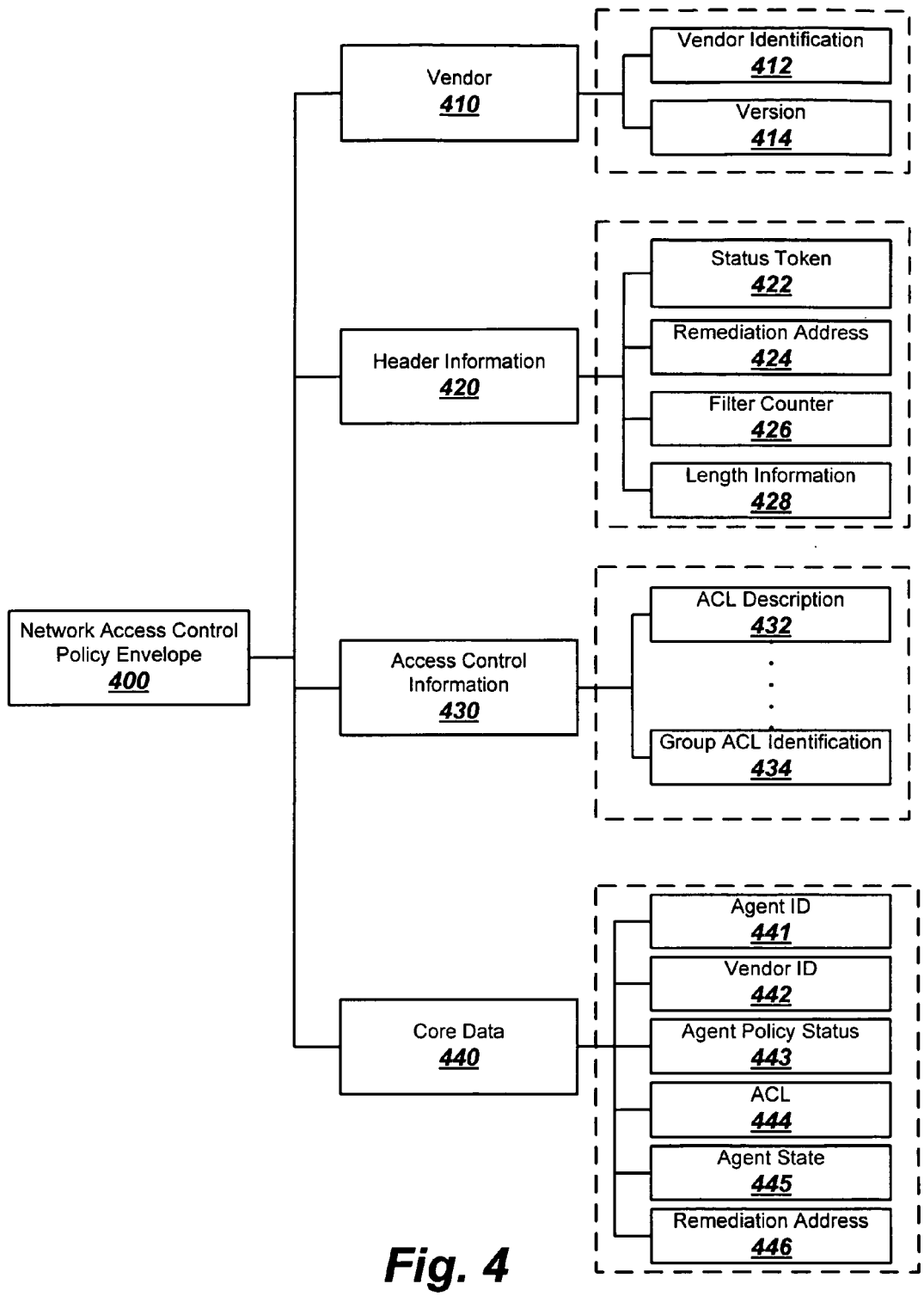
FIG. 4 illustrates a block diagram of a portion of a network access policy message in a secured data envelope including policy information as presented in FIG. 1 in further detail, in accordance with various embodiments.

Referring to FIG. 4, a block diagram of a portion of the policy information in a secured data envelope 400 as presented in FIG. 1 is shown in further detail and in accordance with various embodiments. In various embodiments, the policy information may include vendor information 410, header information 420, access control information 430, and/or core data 440. The vendor information 410 may include vendor identification 412, and/or a version identifier 414 for compatibility. In alternate embodiments, more ore less policy information may be included.

In various embodiments, the header information 420 may provide a status token 422 for posture validation (e.g., allow/remediate/deny), a remediation network address 424 (e.g., a URL address) optionally provided to force contact with a given remediation server, a filter counter 426 to identify a number of filters that follow in the core data 440, and/or a length information 428 representing the total length of the policy information.

Depending on the status token 422, the ACL information 430 may include an ACL Description 432 and a group/ACL identification 434 to group a number of different ACLs pertaining to a certain policy together. The various ACLs may also be included in the ACL information 430. In alternate embodiment, the various access controls may be located in ACL 444 of the core data 440 portion. In various embodiments, the policy information may take the form of one or more access control lists. In one embodiment, the content of each ACL may be represented by a set of 5-tuples. Additional information may also be provided to indicate the location of a remediation network with, among other items, additional access control lists.

In one embodiment of the secured data envelope 400, the core data 440 may include an agent identification 441, a vendor identification 442, policy status 443 for a given agent, at least one ACL 444, agent state information 445, and/or an agent remediation network address 446 (e.g., a URL address), depending on the agent status token 422. The agent remediation network address 446 may be optionally provided to force contact with a given remediation server for the agent, in order to get an agent update and/or ME component update and/or host component update (e.g., by IDE redirect).

Figure 5:
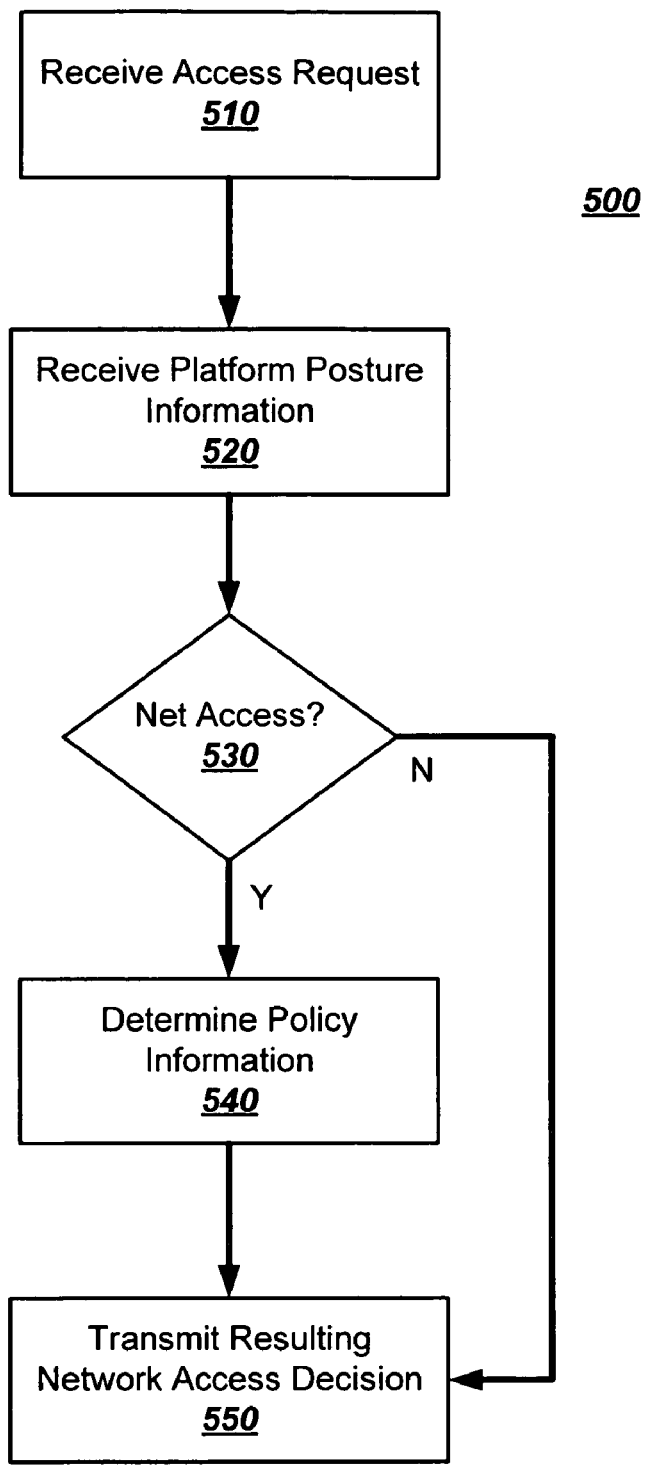
FIG. 5 illustrates a flow diagram view of a portion of the operations of a remote device as presented in FIG. 1 in further detail, in accordance with various embodiments.
Figure 6:
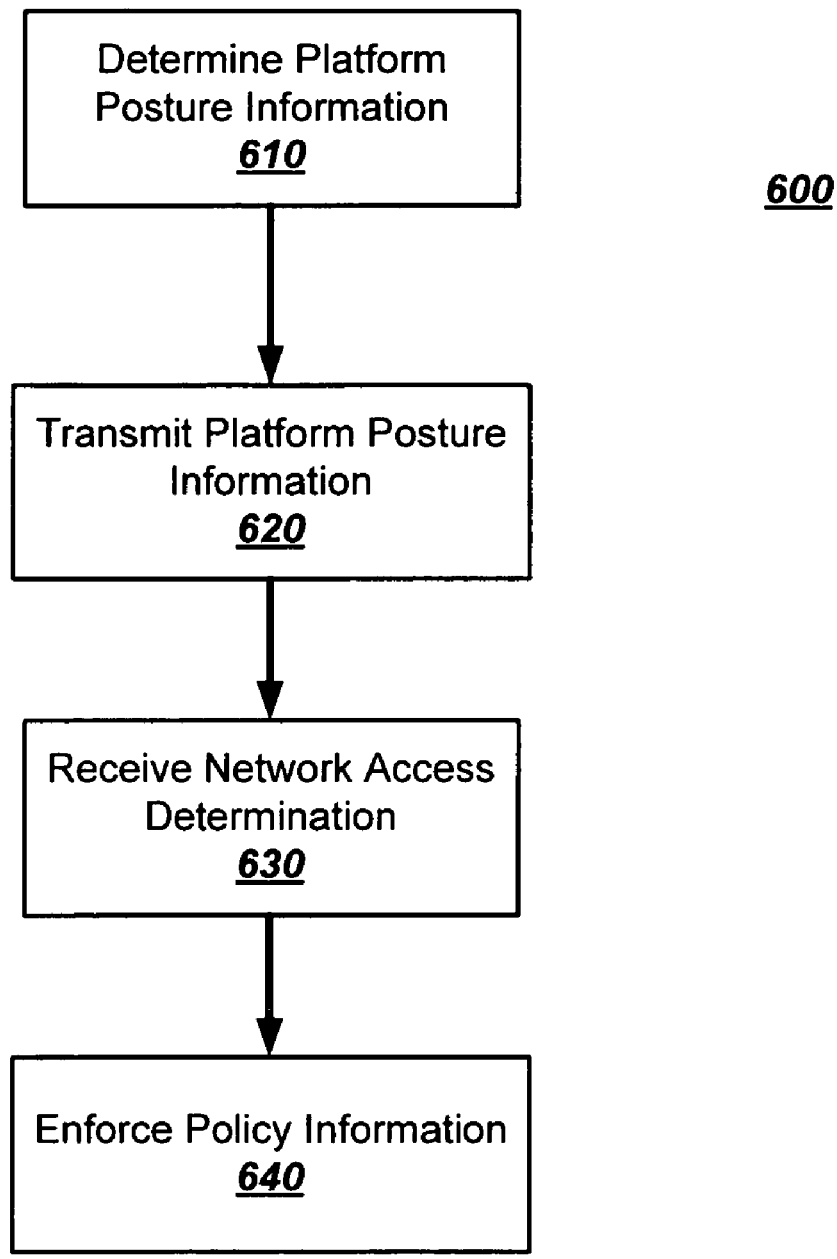
FIG. 6 illustrates a flow diagram view of a portion of the operations of a host platform as presented in FIG. 1 in further detail, in accordance with various embodiments.

Turning now to FIGS. 5 and 6, the methods, in accordance with various embodiments, are described in terms of computer software and hardware with reference to a series of flow diagrams. The methods to be performed by a remote network device and/or host constitute state machines or computer programs made up of computer-executable instructions. These instructions are typically maintained in a storage medium accessible by the remote device.

A storage medium includes any mechanism that provides (i.e., stores and/or transmits) information in a form readable by a machine (e.g., a computer). For example, a storage medium includes read only memory (ROM); random access memory (RAM); magnetic disk storage media; optical storage media; flash memory devices; electrical, optical, acoustical or other form of propagated signals (e.g., carrier waves, infrared signals, digital signals).

Describing the methods by reference to a flow diagram enables one skilled in the art to develop such programs, including such instructions to carry out the methods on suitably configured network devices. In various embodiments, at least one of the processors of a suitably configured network device executes the instructions from the storage medium. The computer-executable instructions may be written in a computer programming language or may be embodied in firmware logic. If written in a programming language conforming to a recognized standard, such instructions can be executed on a variety of hardware platforms and for interfaces to a variety of operating systems.

In addition, various embodiments are not described with reference to any particular programming language. It will be appreciated that a variety of programming languages may be used to implement the teachings of various embodiments as described herein. Furthermore, it is common in the art to speak of software, in one form or another (e.g., program, procedure, process, application . . . ), as taking an action or causing a result. Such expressions are merely a shorthand way of saying that execution of the software by a network device causes the processor of the network device to perform an action or a produce a result.

Referring to FIG. 5, a flow diagram of a portion of the operations of a remote device 500 as presented in FIG. 1 is shown in further detail, in accordance with various embodiments. In various embodiments, the remote device 500 is a network access control Server and/or Policy Decision Point (PDP). In block 510, the remote device receives an access request from a host platform. In one embodiment, the remote device 500 may optionally request (e.g., the platform management components of the host platform) selective platform posture information from the requesting host platform. In block 520, the remote device 500 receives platform posture information from the platform management components of host platform requesting access, independent of the operating system of the host platform. In various embodiments, the platform posture information in various embodiments is transmitted via multiple data fragments in a secured manner, as previously outlined in FIGS. 2 and 3, where each data fragment corresponds to posture information associated with at least one platform component of the host platform.

In query block 530, the remote device 500 determines whether the host platform may be granted access to the network. If not, the associated network access decision is transmitted by the remote device 500 back to the requesting host platform in block 550. If access is granted in query block 530, the remote system 500 determines the associated policy information to govern the access in block 540. Once the policy information is formulated, the resulting network access decision/instructions are transmitted in block 550 by the remote device 500 to the platform management components of the host platform.

In one embodiment, determining whether to grant the requested network access in query block 530, and if network access is to be granted, what policy information, if any, is to govern the network access in block 540 are both based at least in part on the received platform posture information from block 520.

Referring to FIG. 6, a flow diagram of a portion of the operations of a host platform 600 as presented in FIG. 1 is shown in further detail, in accordance with various embodiments. The host platform 600 collects/determines platform posture information in block 610. In one embodiment, the platform posture information is collected by the one or more platform management components that are independent of the operating system on the host platform 600.

Once the platform posture information is collected and assembled, the platform management components of host platform 600 transmits at least a portion of the collected platform posture in block 620 to a remote device as previously presented in FIGS. 1 and 5. In one embodiment, this transmission is performed in a secured manner and independent of the operating system on the host platform 600.

Once a decision regarding the network access request is made, the decision is typically conveyed to a Network Access Device (NAD) or Policy Enforcement Point (PEP), which ultimately controls if and how the client device is allowed onto the network. In block 630, the platform management components of host platform 600 receives a network access determination. In various embodiments, the network access determination is based in part on the previously transmitted platform posture information and may include policy information directed towards specific platform components. Once the network access determination including policy information, if any, have been received in block 630 by the management components of host platform 600, one or more platform management components enforce the policy information in block 640. In various embodiments, the policy information includes at least one access control list (ACL), each ACL indicating usage constraints related to one or more of: time of access, network traffic filters, firmware version, and firmware operational status. The platform management components of host platform 600 used to enforce the policy information is combination of network access control platform management components and/or Policy Enforcement Point (PEP) components.

Although specific embodiments have been illustrated and described herein, it will be appreciated by those of ordinary skill in the art and others, that a wide variety of alternate and/or equivalent implementations may be substituted for the specific embodiment shown in the described without departing from the scope. This application is intended to cover any adaptations or variations of the embodiments discussed herein. Therefore, it is manifested and intended that the various embodiments previously described be limited only by the claims and the equivalence thereof.

What is claimed is:

1. An apparatus comprising:
a first processor residing in an enclosure housing the apparatus and configured to execute an operating system and one or more software components under the direction of the operating system;
a second processor residing in the enclosure housing the apparatus, and configured to execute one or more platform management components, independent and not under the direction of the operating system, to:
determine platform posture information,
transmit to a remote device the platform posture information via a network interface of the apparatus,
receive policy information from the remote device based on the platform posture information, and
facilitate access to a network by the apparatus based at least in part on policy information.

2. The apparatus of claim 1, wherein the platform posture information and the policy information are exchanged and received in an Extensible Markup Language (XML) format.

3. The apparatus of claim 1, wherein the remote device comprises a network access policy decision point (PDP).

4. The apparatus of claim 1, wherein the platform posture information includes host posture information and firmware posture information.

5. The apparatus of claim 1, wherein the platform posture information includes at least one of Basic Input/Output System (BIOS) identification, BIOS revision identification, Extensible Firmware Interface (EFI) identification, EFI revision identification, and Trusted Platform Module capability identification.

6. The apparatus of claim 1, wherein the platform posture information includes at least one of a posture version identification, a vendor identifier, a build date identifier, a posture image size, a number of modules, a module identifier, a module version identification, a module size, and a module flag.

7. The apparatus of claim 1, wherein the platform posture information includes an operational mode, a transport layer security (TLS) state, a Crypto enable fuse state, a provisioning state, a network interface state, an Integrated Development Environment Redirection (IDER) state, a Serial over LAN (SoL) state, a firmware (FW) update state, or a link state.

8. The apparatus of claim 1, wherein the policy information includes one or more data elements to allow and/or to restrict one or more services from executing on the first processor.

9. The apparatus of claim 1, wherein the policy information indicates a location of a remediation network.

10. The apparatus of claim 1, wherein the policy information includes an access control list (ACL).

11. The apparatus of claim 10, wherein the ACL includes one or more constraints about time of access, network traffic filters, firmware version, or firmware operational status.

12. The apparatus of claim 1, wherein the one or more platform management components are configured to facilitate network access of the apparatus based at least in part on the received policy information.

13. The apparatus of claim 1, wherein the platform posture information is provided by employing a secured data envelope having multiple fragments with each fragment having posture information of a corresponding platform component of the apparatus.

14. The apparatus of claim 13, wherein the secured data envelope includes a plurality of fields including information of source identification, destination identification, a nonce, time to live (TTL) status identification, and/or time stamp information.

15. A system comprising:
a network interface;
a first processor and a second processor, wherein the first processor and the second processor reside in an enclosure housing the system, and wherein the second processor is coupled with the network interface;
an operating system of the computing platform and one or more software components under the direction of the operating system configured to be executed by the first processor; and
one or more platform management components configured to be executed by the second processor to determine and exchange platform posture information of the system, independent and not under the direction of the operating system, with a remote device, via the network interface, and to facilitate network access of the computing platform at least in part, in accordance with policy information received from the remote device, wherein the policy information is provided by the remote device based at least in part on the provided platform posture information.

16. The system of claim 15, wherein the remote device comprises a network access policy decision point (PDP).

17. The system of claim 15, wherein the platform posture information and the policy information are exchanged and received in a secured extensible marked up language format, and the platform posture information includes host posture information and firmware posture information.

18. The system of claim 15, wherein the policy information includes at least one access control list (ACL) having one or more data elements to allow and/or to restrict one or more services from executing on the first processor.

19. The system of claim 15, wherein the platform posture information is provided to the remote device by employing a secured data envelope having multiple fragments with each fragment having posture information of a corresponding platform component of the system.

20. The system of claim 19, wherein the secured data envelope includes a plurality of fields including information of source identification, destination identification, a nonce, time to live (TTL) status identification, and/or time stamp information.

21. An article of manufacture comprising:
a non-transitory tangible machine-accessible storage medium having stored therein a plurality of programming instructions, wherein the instructions, in response to execution by a second processor of a machine having an operating system executed by a first processor of the machine, result in the machine performing operations comprising:
determining platform posture information of the machine, independent and not under the direction of the operating system;
transmitting the platform posture information to a remote device via a network interface of the machine independent and not under the direction of the operating system;
receiving policy information from the remote device via the network interface, wherein the policy information is provided based at least in part on the platform posture information transmitted and is configured to govern an access to a network by the machine; and
facilitating an access to the network by the machine based at least in part on the policy information.

22. The article of manufacture of claim 21, wherein the remote device comprises a network access policy decision point (PDP).

23. The article of manufacture of claim 21, wherein the platform posture information comprises host posture information and firmware posture information;
 wherein the host posture information includes at least one of Basic Input/Output System (BIOS) identification, BIOS revision identification, Extensible Firmware Interface (EFI) identification, EFI revision identification, and Trusted Platform Module capability identification; and
 wherein the firmware posture information includes at least one of a posture version identification, a vendor identifier, a build date identifier, a posture image size, a number quantity of modules, a module identifier, a module version identification, a module size, and a module flag.

24. The article of manufacture of claim 21, wherein the policy information includes at least one access control list (ACL), wherein the ACL is configured to indicate usage constraints about time of access, firmware version, or firmware operational status.

* * * * *